United States Patent
Kageura et al.

(10) Patent No.: US 11,088,366 B2
(45) Date of Patent: Aug. 10, 2021

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Jun-ichi Kageura, Ehime (JP); Hiroyuki Kurita, Osaka (JP); Kimiyasu Nakao, Fukui (JP); Ryota Kobayashi, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 79 days.

(21) Appl. No.: 16/344,170

(22) PCT Filed: Oct. 31, 2017

(86) PCT No.: PCT/JP2017/039309
§ 371 (c)(1),
(2) Date: Apr. 23, 2019

(87) PCT Pub. No.: WO2018/079826
PCT Pub. Date: May 3, 2018

(65) Prior Publication Data
US 2019/0319266 A1   Oct. 17, 2019

(30) Foreign Application Priority Data
Oct. 31, 2016   (JP) .............................. JP2016-213836

(51) Int. Cl.
*H01M 4/525* (2010.01)
*H01M 10/0525* (2010.01)
(Continued)

(52) U.S. Cl.
CPC ......... *H01M 4/525* (2013.01); *H01M 4/0435* (2013.01); *H01M 4/131* (2013.01);
(Continued)

(58) Field of Classification Search
CPC ........... H01M 4/525; H01M 2004/028; H01M 4/131; H01M 4/0435; H01M 10/0525; C01G 53/50; C01P 2006/11
See application file for complete search history.

(56) References Cited

U.S. PATENT DOCUMENTS 6,165,642 A    12/2000  Kawakami et al.
9,263,747 B2 *  2/2016  Saruwatari ............ H01M 4/525
(Continued)

FOREIGN PATENT DOCUMENTS

EP   1 667 260 A1   6/2006
EP   2 202 828 A1   6/2010
(Continued)

OTHER PUBLICATIONS

International Search Report issued in corresponding International Patent Application No. PCT/JP2017/039309, dated Dec. 12, 2017, with English Translation.
(Continued)

*Primary Examiner* — Stephan J Essex
(74) *Attorney, Agent, or Firm* — McDermott Will & Emery LLP

(57) ABSTRACT

The present invention provides a positive electrode active material for lithium secondary batteries including: secondary particles obtained by aggregating primary particles capable of being doped and de-doped with lithium ions, in
(Continued)

which the secondary particles have pores, and pore distribution obtained by a mercury intrusion method satisfies requirements (1) and (2) below:
(1) pores that are present in any one or both of the secondary particles or spaces between the secondary particles have a pore peak within a range of a pore radius of equal to or greater than 10 nm and equal to or less than 200 nm; and
(2) a total surface area of pores that have pore radii of equal to or greater than 100 nm and equal to or less than 10 μm among the pores that are present in any one or both of the secondary particles or spaces between the secondary particles is less than 1.1 $m^2/g$.

15 Claims, 3 Drawing Sheets

(51) Int. Cl.
| | | |
|---|---|---|
| *H01M 4/04* | (2006.01) | |
| *H01M 4/131* | (2010.01) | |
| *H01M 4/505* | (2010.01) | |
| *C01G 53/00* | (2006.01) | |
| *H01M 4/02* | (2006.01) | |

(52) U.S. Cl.
CPC ....... *H01M 4/505* (2013.01); *H01M 10/0525* (2013.01); *C01G 53/44* (2013.01); *C01P 2004/61* (2013.01); *C01P 2006/11* (2013.01); *H01M 2004/021* (2013.01); *H01M 2004/028* (2013.01)

(56) References Cited

U.S. PATENT DOCUMENTS

| | | |
|---|---|---|
| 2009/0104517 A1 | 4/2009 | Yuasa et al. |
| 2009/0142668 A1 | 6/2009 | Ishii |
| 2010/0015514 A1* | 1/2010 | Miyagi ............... H01M 4/1393 429/129 |
| 2012/0270093 A1 | 10/2012 | Isozaki et al. |
| 2013/0209888 A1 | 8/2013 | Nagai |
| 2016/0372749 A1 | 12/2016 | Iida et al. |
| 2018/0254511 A1* | 9/2018 | Park ..................... C01G 53/006 |

FOREIGN PATENT DOCUMENTS

| | | |
|---|---|---|
| EP | 2 677 572 A1 | 12/2013 |
| JP | 09-82312 A | 3/1997 |
| JP | 2008-243448 A | 10/2008 |
| JP | 2009-152188 A | 7/2009 |
| JP | 2009-224288 A | 10/2009 |
| JP | 2015-018678 A | 1/2015 |
| JP | 2015-135809 A | 7/2015 |
| WO | 2012/049779 A1 | 4/2012 |

OTHER PUBLICATIONS

Japanese Office Action issued in corresponding Japanese Patent Application No. 2016-213836, dated Oct. 24, 2017, with English Translation.
Japanese Decision of Refusal issued in Japanese Patent Application No. 2016-213836, dated Jan. 23, 2018, with English Translation.
Extended European Search Report issued in corresponding European Patent Application No. 17865733.4-1106, dated Jun. 8, 2020.

* cited by examiner

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE

This application is the U.S. National Phase under 35 U.S.C. § 371 of International Application No. PCT/JP2017/039309, filed on Oct. 31, 2017, which claims the benefit of Japanese Application No. 2016-213836, filed on Oct. 31, 2016, the entire contents of each are hereby incorporated by reference.

TECHNICAL FIELD

The present invention relates to a positive electrode active material for a lithium secondary battery, a positive electrode for a lithium secondary battery, and a lithium secondary battery.

Priority is claimed on Japanese Patent Application No. 2016-213836, filed Oct. 31, 2016, the content of which is incorporated herein by reference.

BACKGROUND ART

A lithium composite oxide has been used as a positive electrode active material for a lithium secondary battery. Practical use of lithium secondary batteries has already advanced not only for small-sized power sources for mobile phones and laptop PCs but also for intermediate and large-sized power sources for vehicles and electric power preservation.

In order to improve the performance of lithium secondary batteries such as battery capacitance, attempts focusing on a peak position of pore distribution of a positive electrode active material for lithium secondary batteries have been conducted (Patent Documents 1 and 2, for example).

CITATION LIST

Patent Literature

[Patent Document 1]
  Japanese Unexamined Patent Application, First Publication No. 2008-243448
[Patent Document 2]
  Japanese Unexamined Patent Application, First Publication No. Hei 9-82312

SUMMARY OF INVENTION

Technical Problem

With an increase in application fields of lithium secondary batteries, not only improvements in battery properties such as reduction of battery resistance, but also improvements in producibility have been required for positive electrode active materials for lithium secondary batteries. Specifically, in order to improve producibility, it is possible to manufacture a positive electrode for lithium secondary batteries without concern of a powder of a positive electrode active material falling and adhering to a roll if the positive electrode active material sufficiently adheres to a current collector (in other words, peeling strength of the positive electrode active material with respect to the current collector is high).

However, there is still room for improvement in terms not only of improvements in battery properties but also of improvements in producibility in positive electrode active materials for lithium secondary batteries as disclosed in Patent Documents 1 to 2 described above.

The present invention was made in view of the aforementioned circumstances, and an object thereof is to provide a positive electrode active material for lithium batteries with low battery resistance and improved peeling strength, a positive electrode for lithium secondary batteries using the positive electrode active material for lithium secondary batteries, and a lithium secondary battery including the positive electrode for lithium secondary batteries.

Solution to Problem

That is, the present invention covers the following inventions [1] to [7].

[1] A positive electrode active material for lithium secondary batteries including: secondary particles obtained by aggregating primary particles capable of being doped and de-doped with lithium ions, wherein the secondary particles have pores, and pore distribution obtained by a mercury intrusion method satisfies requirements (1) and (2) below:

(1) pores that are present in any one or both of the secondary particles or spaces between the secondary particles have a pore peak within a range of a pore radius of equal to or greater than 10 nm and equal to or less than 200 nm; and (2) a total surface area of pores that have pore radii of equal to or greater than 100 nm and equal to or less than 10 μm among the pores that are present in any one or both of the secondary particles or spaces between the secondary particles is less than 1.1 m²/g.

[2] The positive electrode active material for lithium secondary batteries according to [1], wherein the positive electrode active material is represented by the following composition formula (I):

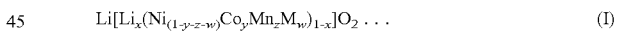

$$Li[Li_x(Ni_{(1-y-z-w)}Co_yMn_zM_w)_{1-x}]O_2 \ldots \quad (I)$$

(where M represents one or more elements selected from the group consisting of Fe, Cu, Ti, Mg, Al, W, B, Mo, Nb, Zn, Sn, Zr, Ga, and V, and 0≤x≤0.2, 0<y≤0.4, 0≤z≤0.4, and 0≤w≤0.1 are satisfied).

[3] The positive electrode active material for lithium secondary batteries according to [1] or [2], wherein a tap density is equal to or less than 2.5 g/cc.

[4] The positive electrode active material for lithium secondary batteries according to any one of [1] to [3] wherein an average secondary particle diameter is equal to or greater than 3 μm and equal to or less than 15 μm.

[5] The positive electrode active material for lithium secondary batteries according to any one of [1] to [4], wherein (a total surface area of pores that have pore radii of equal to or greater than 10 nm and equal to or less than 50 nm)/(a total surface area of pores that have pore radii of equal to or greater than 10 nm and equal to or less than 100 μm) is equal to or greater than 0.20.

[6] A positive electrode for lithium secondary batteries including the positive electrode active material for lithium secondary batteries according to any one of [1] to [5].

[7] A lithium secondary battery including the lithium secondary battery according to [6].

Advantageous Effects of Invention

According to the invention, it is possible to provide a positive electrode active material for lithium batteries with low battery resistance and improved peeling strength, a positive electrode for lithium secondary batteries using the positive electrode active material for lithium secondary batteries, and a lithium secondary battery including the positive electrode for lithium secondary batteries.

DESCRIPTION OF EMBODIMENTS

Figure 1A:
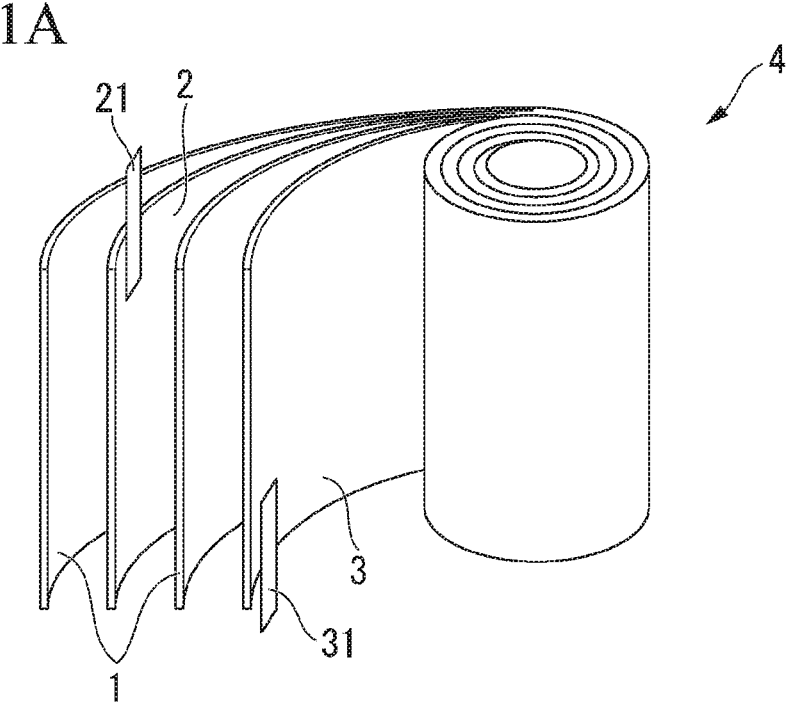
FIG. 1A is an outline configuration diagram showing an example of a lithium ion secondary battery.

<Positive Electrode Active Material for Lithium Secondary Battery>

An embodiment of the invention is a positive electrode active material for a lithium secondary battery that includes secondary particles obtained by aggregating primary particles capable of being doped and de-doped with lithium ions (hereinafter, also referred to as a "positive electrode active material).

The primary particles are a minimum unit observed as independent particles through SEM, and the particles are monocrystal or polycrystal in which crystallites gather. The secondary particles are particles formed by the gathering primary particles and can be observed through SEM observation or by a laser diffraction scattering method, which will be described later.

The positive electrode active material according to an embodiment of the invention satisfies the following requirements (1) and (2) in regard to pore distribution obtained by a mercury intrusion method:

(1) pores that are present in any one or both of the secondary particles or spaces between the secondary particles have a pore peak within a range of a pore radius of equal to or greater than 10 nm and equal to or less than 200 nm; and (2) a total surface area of pores that have pore radii of equal to or greater than 100 nm and equal to or less than 10 μm among the pores that are present in any one or both of the secondary particles or spaces between the secondary particles is less than 1.1 m²/g.

<<Measurement of Pore Distribution by Mercury Intrusion Method>>

The aforementioned requirements (1): the pore peak and (2): pore surface area can be calculated from pore distribution obtained by a mercury intrusion method.

In the embodiment, measurement of pore distribution based on the mercury intrusion method is performed by the following method.

First, a container with the positive electrode active material prepared therein is exhausted into a vacuum, and the container is then filled with mercury. Although mercury has high surface tension, and mercury does not enter pores on the surface of the positive electrode active material under normal circumstances, mercury gradually enters the pores in order from pores with larger diameters to pores with smaller diameters if pressure is applied to the mercury and is gradually raised. If the amount of mercury injected into the pores is detected while the pressure is caused to successively increase, a mercury injection curve is obtained from a relationship between the pressure applied to the mercury and the amount of injected mercury.

Here, on the assumption that the shape of the pores is a cylindrical shape, the pressure applied to the mercury is P, the pore size (pore diameter) is D, the mercury surface tension is σ, and a contact angle between mercury and the sample is θ, the pore size is represented by the following Formula (A).

$$D = -4\sigma \times \cos \theta / P \quad (A)$$

That is, since there is a correlation between the pressure P applied to the mercury and the diameter D of the pores that the mercury enters, it is possible to obtain a pore distribution curve representing how much larger the pore radius is and the volume of the positive electrode active material on the basis of the obtained mercury injection curve. On the assumption that the length of the pore with the pore size D is L, the volume V thereof is represented by the following Formula (B).

$$V = \pi D^2 L / 4 \quad (B)$$

Since the cylindrical side area S=πDL, it is possible to represent S=4 V/D. Here, on the assumption that an increase in volume dV within a certain pore size range is caused by a certain cylindrical pore with an average pore size, it is possible to obtain a specific surface area that has increased in the section as dA=4 dV//Dav (Day is an average pore size). Therefore, the pore specific surface area ΣA is calculated. Note that an approximate measurement limit of the pore size based on the mercury intrusion method is equal to or greater than about 2 nm and equal to or less than about 200 μm. The measurement based on the mercury intrusion method can be performed using a device such as a mercury porosimeter. Specific examples of the mercury porosimeter include Autopore III9420 (manufactured by Micromeritics).

[Requirement (1)]

In the embodiment, the secondary particles of the positive electrode active material have fine gaps (hereinafter, also referred to as "intra-secondary particle gaps") through which the surfaces of the particles communicate with the inner portions of the particles inside the secondary particles. Also, the secondary particles of the positive electrode active material has fine gaps (hereinafter, also referred to as "inter-secondary particle fine gaps") between the secondary particles. In the embodiment, any one or both of the intra-secondary particle fine gaps and the inter-secondary particle gaps have a pore peak within a range of a pore radius of equal to or greater than 10 nm and equal to or less than 200 nm in the aforementioned pore distribution obtained on the basis of the mercury intrusion method.

The pore radius of the pore peak of the intra-secondary particle fine gaps is preferably equal to or greater than 20 nm, is more preferably equal to or greater than 30 nm, and is particularly preferably equal to or greater than 40 nm.

Also, the pore radius of the pore peak of the intra-secondary particle fine gaps is preferably equal to or less than 180 nm, is more preferably equal to or less than 150 nm, and is particularly preferably equal to or less than 120 nm.

The aforementioned upper limit values and the aforementioned lower limit values can be arbitrarily combined.

For example, the pore radius of the pore peak of the intra-secondary particle fine gaps is preferably equal to or greater than 20 nm and equal to or less than 180 nm, is more preferably equal to or greater than 30 nm and equal to or less than 150 nm, and is further preferably equal to or greater than 40 nm and equal to or less than 120 nm.

In the embodiment, "pore peak" means a peak with the highest strength within the specific range.

In the embodiment, if the pore radius of the intra-secondary particle fine gaps falls within the aforementioned specific range, it is possible to obtain a positive electrode active material through which an electrolyte solution penetrates and which has low direct current resistance.

In the embodiment, the pore peak of the intra-secondary particle fine gaps preferably falls within the aforementioned specific range.

[Requirement (2)]

In the embodiment, the total surface area of the pores with pore radii of equal to or greater than 100 nm and equal to or less than 10 μm (hereinafter referred to as a "pore surface area S") among any one or both of the intra-secondary particle fine gaps or the inter-secondary particle gaps is less than 1.1 m²/g in the aforementioned pore distribution obtained on the basis of the mercury intrusion method.

The pore surface area S is preferably equal to or less than 1.0 m²/g, is more preferably equal to or less than 0.9 m²/g, and is particularly preferably equal to or less than 0.85 m²/g.

Also, the pore surface area S is preferably equal to or greater than 0.01 m²/g, is more preferably equal to or greater than 0.1 m²/g, and is particularly preferably equal to or greater than 0.15 m²/g.

The aforementioned upper limits and the aforementioned lower limits can be arbitrarily combined.

For example, the pore surface area S is preferably equal to or greater than 0.01 m²/g and equal to or less than 1.0 m²/g, is more preferably equal to or greater than 0.1 m²/g and equal to or less than 0.9 m²/g, and is particularly preferably equal to or greater than 0.15 m²/g and equal to or less than 0.85 m²/g.

In the embodiment, permeability of a binder is improved if the pore surface area S is equal to or less than the aforementioned upper limit value. Therefore, it is possible to cause a binder constituent to be present at an interface with the current collector. This will be described with reference to the drawings.

In the embodiment, the total surface area of the pores with the pore radii of equal to or greater than 100 nm and equal to or less than 10 μm of the inter-secondary particle gaps preferably falls within the aforementioned specific range.

In the embodiment, the pore peak within the range of the pore radii of equal to or greater than 10 nm and equal to or less than 100 nm is assumed to be a peak derived from the intra-secondary particle fine gaps in the pore distribution obtained on the basis of the mercury intrusion method.

Figure 3:
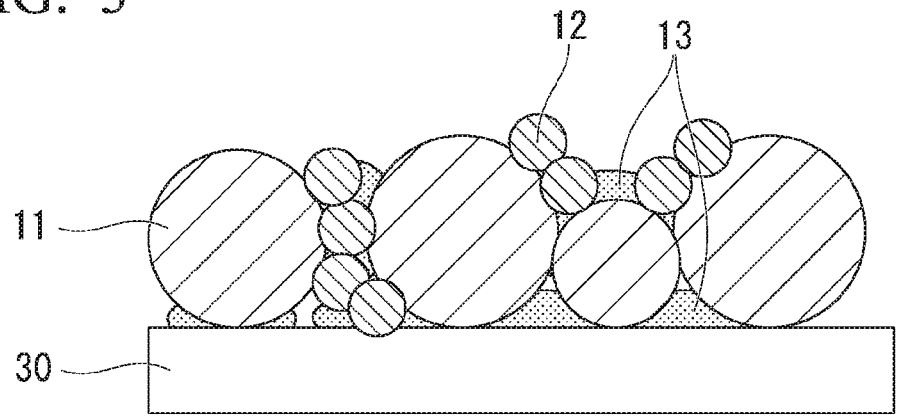
FIG. 3 is a schematic diagram of a section of a positive electrode to which the invention is applied.

FIG. 3 is a schematic diagram of a section of a positive electrode obtained by preparing a positive electrode mixture that includes a positive electrode active material 11 that satisfies the requirement (2) in the embodiment, a conductive material 12, and a binder 13 and causing the current collector 30 to carry the positive electrode mixture.

As shown in FIG. 3, the positive electrode active material that satisfies the requirement (2) in the embodiment facilitates penetration of the binder through the inter-secondary particle gaps and enables disposition of a large amount of the binder at the interface with the current collector 30. Therefore, it is possible to expect the binder contributing to adhesion between the current collector 30 and the positive electrode mixture to increase and a positive electrode with high strength to be able to be obtained.

Figure 4:
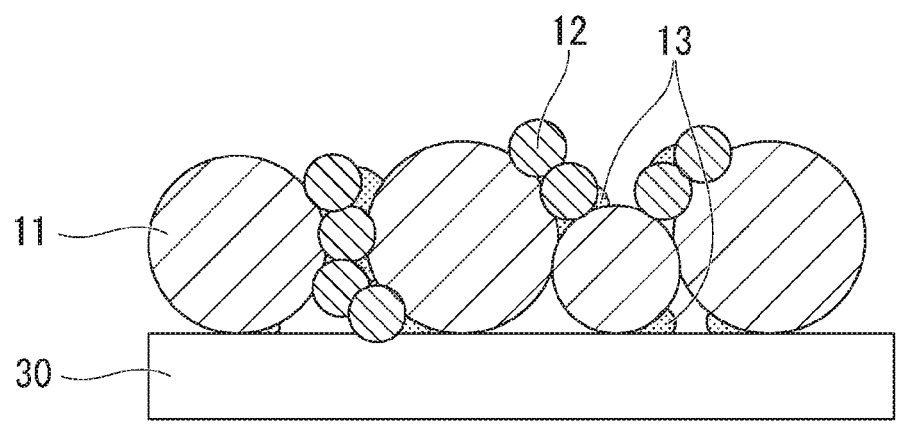
FIG. 4 is a schematic diagram of a section of a positive electrode to which the invention is not applied.

Meanwhile, in a case in which the invention is not applied, the binder 13 hardly penetrates through the inter-secondary particle gaps and hardly reaches the interface with the current collector 30 as shown in FIG. 4. It is thus considered that a sufficient binder constituent for causing the current collector 30 and the positive electrode mixture to adhere to each other cannot be secured and that the peeling strength is degraded.

In the embodiment, a lithium metal composite oxide powder is represented by the following Formula (I)

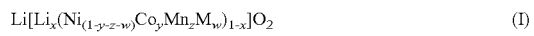

$$Li[Li_x(Ni_{(1-y-z-w)}Co_yMn_zM_w)_{1-x}]O_2 \quad (I)$$

(where M represents one or more elements selected from the group consisting of Fe, Cu, Ti, Mg, Al, W, B, Mo, Nb, Zn, Sn, Zr, Ga, and V, and $0 \leq x \leq 0.2$, $0 < y \leq 0.4$, $0 \leq z \leq 0.4$, and $0 \leq w \leq 0.1$ are satisfied).

From the viewpoint that it is possible to obtain a lithium secondary battery with high cycle properties, x in the composition formula (I) is preferably greater than 0, is more preferably equal to or greater than 0.01, and is further preferably equal to or greater than 0.02. Also, from the viewpoint that it is possible to obtain a lithium secondary battery with higher initial coulombic efficiency, x in the composition formula (I) is preferably equal to or less than 0.1, is more preferably equal to or less than 0.08, and is further preferably equal to or less than 0.06.

The upper limit values and the lower limit values of x can be arbitrarily combined.

For example, x is preferably greater than 0 and equal to or less than 0.1, is more preferably equal to or greater than 0.01 and equal to or less than 0.08, and is further preferably equal to or greater than 0.02 and equal to or less than 0.06.

Also, from the viewpoint that it is possible to obtain a lithium secondary battery with low battery resistance, y in the aforementioned composition formula (I) is preferably equal to or greater than 0.005, is more preferably equal to or greater than 0.01, and is further preferably equal to or greater than 0.05. Also, from the viewpoint that it is possible to obtain a lithium secondary battery with high thermal stability, y in the aforementioned composition formula (I) is more preferably equal to or less than 0.35 and is further preferably equal to or less than 0.33.

The upper limit values and the lower limit values of y can be arbitrarily combined.

For example, y is preferably equal to or greater than 0.005 and equal to or less than 0.35, is more preferably equal to or greater than 0.01 and equal to or less than 0.33, and is further preferably equal to or greater than 0.05 and equal to or less than 0.33.

Also, from the viewpoint that it is possible to obtain a lithium secondary battery with high cycle properties, z in the aforementioned composition formula (I) is preferably equal to or greater than 0.01, is more preferably equal to or greater than 0.03, and is further preferably equal to or greater than 0.1. Also, from the viewpoint that it is possible to obtain a lithium secondary battery with high preservation properties at a high temperature (in an environment of 60° C., for example), z in the aforementioned composition formula (I) is preferably equal to or less than 0.4, is more preferably equal to or less than 0.38, and is further preferably equal to or less than 0.35.

The upper limit values and the lower limit values of z can be arbitrarily combined.

For example, z is preferably equal to or greater than 0.01 and equal to or less than 0.4, is more preferably equal to or greater than 0.03 and equal to or less than 0.38, and is further preferably equal to or greater than 0.1 and equal to or less than 0.35.

Also, from the viewpoint that it is possible to obtain a lithium secondary battery with low battery resistance, w in the aforementioned composition formula (I) is preferably greater than 0, is more preferably equal to or greater than 0.0005, and is further preferably equal to or greater than 0.001. Also, from the viewpoint that it is possible to obtain a lithium secondary battery with high discharging capacitance at a high current rate, w in the aforementioned composition formula (I) is preferably equal to or less than 0.09, is more preferably equal to or less than 0.08, and is further preferably equal to or less than 0.07.

The upper limit values and the lower limit values of w can be arbitrarily combined.

For example, w is preferably greater than 0 and equal to or less than 0.09, is more preferably equal to or greater than 0.0005 and equal to or less than 0.08, and is further preferably equal to or greater than 0.001 and equal to or less than 0.07.

M in the composition formula (I) represents one or more elements selected from the group consisting of Fe, Cu, Ti, Mg, Al, W, B, Mo, Nb, Zn, Sn, Zr, Ga, and V.

Also, from the viewpoint that it is possible to obtain a lithium secondary battery with high cycle properties, M in the composition formula (I) is preferably at least one kind selected from the group consisting of Ti, Mg, Al, W, B, and Zr, and from the viewpoint that it is possible to obtain a lithium secondary battery with high thermal stability, M is preferably at least one kind selected from the group consisting of Al, W, B, and Zr.

(Tap Density of Positive Electrode Active Material)

In the embodiment, the tap density of the positive electrode active material for lithium secondary batteries is preferably equal to or less than 2.5 g/cc because this enables a lithium secondary battery with high electrode density to be obtained.

The tap density can be measured on the basis of JIS R 1628-1997.

(Average Secondary Particle Diameter)

In the embodiment, the average secondary particle diameter of the lithium metal composite oxide powder is preferably equal to or greater than 3 μm, is more preferably equal to or greater than 4 μm, and is further preferably equal to or greater than 5 μm from the viewpoint that handling properties of the positive electrode active material for lithium secondary batteries are enhanced. Also, from the viewpoint that it is possible to obtain a lithium secondary battery with high discharging capacitance at a high current rate, the average secondary particle diameter is preferably equal to or less than 15 μm, is more preferably equal to or less than 13 μm, and is further preferably equal to or less than 12 μm.

The upper limit values and the lower limit values of the average secondary particle diameter can be arbitrarily combined.

For example, the average secondary particle diameter of the lithium metal composite oxide powder is preferably equal to or greater than 3 μm and equal to or less than 15 μm, is more preferably equal to or greater than 4 μm and equal to or less than 13 μm, and is further preferably equal to or greater than 5 μm and equal to or less than 12 μm.

In the invention, the "average secondary particle diameter" of the lithium metal composite oxide powder represents a value measured by the following method (a laser diffraction scattering method).

0.1 g of a lithium metal composite oxide powder is poured into 50 ml of a 0.2% by mass sodium hexametaphosphate aqueous solution, thereby obtaining a dispersion with the powder dispersed therein. Granularity distribution of the obtained dispersion is measured using a laser diffraction granularity distribution analyzer (manufactured by Horiba Ltd., model No. LA-950), and a volume-based cumulative particle size distribution curve is obtained. In the obtained cumulative granularity distribution curve, a value of a particle size (D50) when seen from the side of the fine particles at the time of 50% accumulation is regarded as the average secondary particle diameter of the lithium metal composite oxide powder.

In the embodiment, when the electrode mixture in the paste form using the lithium metal composite oxide powder is created, (the total surface area of the pores with the pore radii of equal to or greater than 10 nm and equal to or less than 50 nm)/(the total surface area of the pores with the pore radii of equal to or greater than 10 nm and equal to or less than 100 μm) is preferably equal to or greater than 0.20, is more preferably equal to or greater than 0.25, and is further preferably equal to or greater than 0.30 from the viewpoint that stability of paste viscosity over time is enhanced.

(Layered Structure)

A crystal structure of the lithium metal composite oxide is a layered structure and is more preferably a hexagonal crystal structure or a monoclinic crystal structure.

The hexagonal crystal structure is attributable to any one of space groups selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3/m$, P622, $P6_122$, $P6_522$, $P6_222$, $P6_422$, $P6_322$, P6mm, P6cc, $P6_3cm$, $P6_3mc$, P-6m2, P-6c2, P-62m, P62c, P6/mmm, P6/mcc, $P6_3/mcm$, and $P6_3/mmc$.

Also, the monoclinic crystal structure is attributable to any one of space groups selected from the group consisting of P2, $P2_1$, C2, Pm, Pc, Cm, Cc, P2/m, $P2_1/m$, C2/m, P2/c, $P2_1/c$, and C2/c.

Among them, the crystal structure is particularly preferably a hexagonal crystal structure that is attributable to the space group R-3m or a monoclinic crystal structure that is attributable to C2/m from the viewpoint that it is possible to obtain a lithium secondary battery with high charging capacitance.

As the lithium compound in the embodiment, any one of lithium carbonate, lithium nitrate, lithium sulfate, lithium acetate, lithium hydroxide, lithium oxide, lithium chloride, and lithium fluoride can be used, or two or more compounds can be mixed and used. Among them, any one or both of lithium hydroxide and lithium carbonate are preferably used.

From the viewpoint of enhancing the handling properties of the positive electrode active material for lithium secondary batteries, a lithium carbonate constituent included in the lithium metal composite oxide powder is preferably equal to or less than 0.4% by mass, is more preferably equal to or less than 0.39% by mass, and is particularly preferably equal to or less than 0.38% by mass.

Also, from the viewpoint of enhancing the handling properties of the positive electrode active material for lithium secondary batteries, a lithium hydroxide constituent included in the lithium metal composite oxide powder is preferably equal to or less than 0.35% by mass, is more preferably equal to or less than 0.25% by mass, and is particularly preferably equal to or less than 0.2% by mass.

[Method of Manufacturing Positive Electrode Active Material for Lithium Secondary Batteries]

For manufacturing the positive electrode active material for lithium secondary batteries according to the embodiment (hereinafter, also referred to as a "lithium metal composite oxide"), it is preferable that a metal composite compound including a metal other than lithium, that is, an essential metal configured of Ni, Co, and Mn, and one or more arbitrary elements selected from Fe, Cu, Ti, Mg, Al, W, B, Mo, Nb, Zn, Sn, Zr, Ga, and V be first prepared and that the metal composite compound be burned with an appropriate lithium salt. The metal composite compound, a metal composite hydroxide or a metal composite oxide is preferably used. Hereinafter, an example of a method of manufacturing the positive electrode active material will be described separately for a process of manufacturing a metal composite compound and a process of manufacturing a lithium metal composite oxide.

(Process of Manufacturing Metal Composite Compound)

The metal composite compound can typically be manufactured by a known batch coprecipitation method or a successive coprecipitation method. Hereinafter, a method of manufacturing a metal composite oxide including nickel, cobalt, and manganese as metal will be described in detail as an example.

First, a nickel salt solution, a cobalt salt solution, a manganese salt solution, and a complexing agent are caused to react by the successive method disclosed in Japanese Unexamined Patent Application, First Publication No. 2002-201028, in particular, thereby manufacturing a composite metal hydroxide represented as $Ni_aCo_bMn_c(OH)_2$ (where a+b+c=1).

A nickel salt that is a solute of the aforementioned nickel salt solution is not particularly limited, any of nickel sulfate, nickel nitride, nickel chloride, and nickel acetate can be used, for example. As a cobalt salt that is a solute of the aforementioned cobalt salt solution, any of cobalt sulfate, cobalt nitrate, and cobalt chloride can be used, for example. As a manganese salt that is a solute of the aforementioned manganese salt solution, any of manganese sulfate, manganese nitrate, and manganese chloride can be used, for example. The aforementioned metal salts are used at proportions corresponding to the composition ratio of $Ni_a\text{-}Co_bMn_c(OH)_2$ as described above.

Also, water is used as a solvent.

That is, amounts of the respective metal salts are defined such that a molar ratio of nickel, cobalt, and manganese in the mixture solution including the aforementioned metal salts becomes a:b:c.

A complexing agent that can form a complex with ions of nickel, cobalt, and manganese in an aqueous solution, and examples thereof include ammonium ion donors (such as ammonium sulfate, ammonium chloride, ammonium carbonate, and ammonium fluoride), hydrazine, an ethylenediaminetetraacetic acid, a nitrilotriacetic acid, uracildiacetic acid, and glycine.

At the time of precipitation, an alkali metal hydroxide (for example, sodium hydroxide or potassium hydroxide) is added as needed in order to adjust the pH value of the aqueous solution.

If the aforementioned nickel salt solution, the cobalt salt solution, the manganese salt solution, and the complexing agent are caused to be successively supplied to the reaction tank, nickel, cobalt, and manganese react, thereby manufacturing $Ni_aCo_bMn_c(OH)_2$. At the time of the reaction, the temperature in the reaction tank is controlled within a range of equal to or greater than 20° C. and equal to or less than 80° C., preferably within a range of equal to or greater than 30° C. and equal to or less than 70° C., for example, the pH value (40° C. basis) in the reaction tank is controlled within a range of equal to or greater than pH 9 and equal to or less than pH 13, preferably within a range of equal to or greater than pH 11 and equal to or less than pH 13, for example, and the substances in the reaction tank are appropriately stirred. The reaction tank is of a type of causing the formed reaction precipitate to be overflown for separation.

By appropriately controlling the concentration of the metal salts to be supplied to the reaction tank, the stirring speed, the reaction temperature, the reaction pH, and burning conditions and the like, which will be described later, it is possible to control various physical properties such as pore radii and the average secondary particle diameter represented as the requirements (1) and (2) as described above of the lithium metal composite oxide that is finally obtained in the following process. In particular, in order to realize the desired pore radii represented as the requirements (1) and (2), bubbling with various kinds of gas, for example, inert gas such as nitrogen, argon, or carbon dioxide, oxidation gas such as air or oxygen, or mixture gas thereof, for example, may be used in combination with the aforementioned control of conditions. As substances that promote an oxidized state in addition to the gas, it is possible to use peroxide such as hydrogen peroxide, peroxide salt such as permanganate, perchlorate, hypochlorite, a nitric acid, halogen, ozone, or the like. As substances that promote a reduced state in addition to the gas, it is possible to use organic acids such as an oxalic acid and a formic acid, subsulfate, hydrazine, or the like.

If the reaction pH in the reaction tank is raised, for example, the primary particle diameter of the metal composite compound decreases, and a metal composite compound with a high BET specific surface area tends to be obtained. Meanwhile, if the reaction pH is reduced, a metal composite compound with a low BET specific surface area tends to be obtained. Also, if the oxidized state in the reaction tank is raised, a metal composite oxide with many gaps tends to be obtained. Meanwhile, if the oxidized state is reduced, a fine metal oxide tends to be obtained.

Finally, the respective conditions of the reaction pH and the oxidized state are precisely controlled such that the metal composite compound finally has desired physical properties, and it is possible to control pore sizes in the gaps of the metal composite compound by causing oxidation gas to be successively ventilated in the reaction tank while inert gas such as nitrogen gas is caused to be ventilated. In a case in which air is used as the oxidation gas, a ratio A/B of the air flow rate A (L/min) and the volume B(L) of the reaction tank is preferably greater than 0 and less than 0.020.

The pore radii represented as the requirements (1) and (2) as described above of the lithium metal composite oxide powder in the embodiment can be caused to fall within the specific range according to the embodiment by controlling burning conditions and the like, which will be described later, using the aforementioned metal composite compound.

After the aforementioned reaction, the obtained reaction precipitate is washed with water and is dried, thereby isolating a nickel, cobalt, manganese hydroxide as a nickel, cobalt, manganese composite compound. Also, the reaction precipitate may be washed with a weak acid water or an alkali solution including sodium hydroxide or potassium hydroxide as needed.

Note that although the nickel, cobalt, manganese composite hydroxide is manufactured in the aforementioned example, a nickel, cobalt, manganese composite oxide may be prepared.

In the case in which the nickel, cobalt, manganese composite oxide is prepared, a process of causing the aforementioned coprecipitation slurry to be in contact with an oxidant or a process of thermally processing the nickel, cobalt, manganese composite hydroxide, for example, may be performed.

(Process of Manufacturing Lithium Metal Composite Oxide)

The aforementioned metal composite oxide or hydroxide is dried and then mixed with a lithium salt. Although drying conditions are not particularly limited, any of conditions under which the metal composite oxide or hydroxide is neither oxidized nor reduced (specifically, conditions under which the oxide is maintained as the oxide or conditions under which the hydroxide is maintained as hydroxide), conditions under which the metal composite hydroxide is oxidized (specifically, drying conditions under which the hydroxide is oxidized into an oxide), and conditions under which the metal composite oxide is reduced (specifically, drying conditions under which the oxide is reduced into a hydroxide). For the conditions under which the metal composite oxide or hydroxide is neither oxidized nor reduced, it is only necessary to use inert gas such as rare gas such as nitrogen, helium, or argon, and for the conditions under which the hydroxide is oxidized, oxidation may be performed in an atmosphere of oxygen or air. Also, for the conditions under which the metal composite oxide is reduced, a reducing agent such as hydrazine or sodium sulfite may be used in an atmosphere of inert gas. As the lithium salt, any one of lithium carbonate, lithium nitrate, lithium acetate, lithium hydroxide, lithium hydroxide hydrate, and lithium oxide may be used, or two or more thereof may be mixed and used.

After the metal composite oxide or hydroxide is dried, the metal composite oxide or hydroxide may be appropriately classified. The aforementioned lithium salt and the metal composite metal hydroxide are used in consideration of a composition ratio of a final target product. In a case in which a nickel, cobalt, manganese composite hydroxide is used, for example, the lithium salt and the aforementioned composite metal hydroxide are used at proportions corresponding to a composition ratio of $Li[Li_d(Ni_aCo_bMn_c)_{1-d}]O_2$. A mixture of the nickel, cobalt, manganese composite metal hydroxide and the lithium salt is burned, thereby obtaining a lithium-nickel, cobalt, manganese composite oxide. Note that for the burning, drying air, an oxygen atmosphere, an inert atmosphere, or the like is used in accordance with a desired composition, and a plurality of heating processes are performed as needed.

The burning temperature of the aforementioned metal composite oxide or hydroxide and the lithium compound such as lithium hydroxide or lithium carbonate is preferably equal to or greater than 600° C. and equal to or less than 1100° C., is more preferably equal to or greater than 750° C. and equal to or less than 1050° C., and is further preferably equal to or greater than 800° C. and equal to or less than 1025° C. in order to cause the aforementioned requirements (1) and (2) of the lithium metal composite oxide to fall within the specific range of the embodiment.

The burning time is preferably equal to or greater than 3 hours and equal to or less than 50 hours. If the burning time exceeds 50 hours, no problem occurs in terms of battery performances while the battery performances substantially tend to be degraded due to volatilization of lithium. If the burning time is less than 3 hours, crystal tends to be poorly developed, and the battery performances tend to be degraded. Note that it is also effective to perform temporal burning before the aforementioned burning. The temperature of the temporal burning is preferably within a range of equal to or greater than 300° C. and equal to or less than 850° C., and the burning is preferably performed for a time of equal to or greater than 1 hour and equal to or less than 10 hours.

In the embodiment, the burning time means a total time until maintaining of the temperature ends after the burning temperature is reached. In a case in which the temporal burning is performed, the burning time means a total time until the maintaining of the temperatures ends after the burning temperatures in the respective burning processes are reached.

The lithium metal composite oxide obtained by the burning is appropriately classified after pulverization, thereby obtaining a positive electrode active material that can be applied to lithium secondary batteries.

<Lithium Secondary Battery>

Next, a positive electrode using the positive electrode active material for a lithium secondary battery according to the embodiment as a positive electrode active material for a lithium secondary battery and a lithium secondary battery having the positive electrode will be described while describing a configuration of the lithium secondary battery.

In one example, the lithium secondary battery according to the embodiment has a positive electrode and a negative electrode, a separator interposed between the positive electrode and the negative electrode, and an electrolyte solution disposed between the positive electrode and the negative electrode.

Figure 1B:
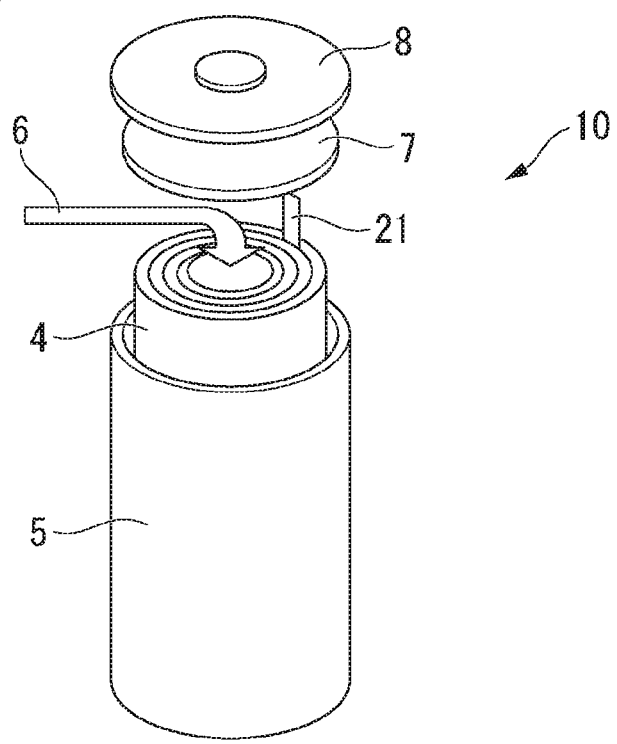
FIG. 1B is an outline configuration diagram showing an example of the lithium ion secondary battery

FIGS. 1A and 1B are schematic diagrams showing an example of the lithium secondary battery according to the embodiment. A cylindrical lithium secondary battery 10 according to the embodiment is manufactured as follows.

First, as shown in FIG. 1A, a pair of separator 1 with a belt shape, a positive electrode 2 with a belt shape that has a positive electrode lead 21 at first end, and a negative electrode 3 with a belt shape that has a negative electrode lead 31 at first end are laminated in an order of the separator 1, the positive electrode 2, the separator 1, and the negative electrode 3 and are wound, thereby obtaining an electrode group 4.

Next, as shown in FIG. 1B, the electrode group 4 and an insulator, which is not shown in the drawing, are accommodated in a battery case 5, a case bottom is sealed, an electrolyte solution 6 is caused to be impregnated in the electrode group 4, and the electrolyte solution is disposed between the positive electrode 2 and the negative electrode 3. It is possible to manufacture the lithium secondary battery 10 by further sealing an upper portion of the battery case 5 with a top insulator 7 and a sealing body 8.

Examples of the shape of the electrode group 4 include columnar shapes with sectional shapes that are a circle, an oval, a rectangle, and a rectangle with rounded corners when the electrode group 4 is cut in the vertical direction with respect to an axis of the winding.

Also, as the shape of the lithium secondary battery that has such an electrode group 4, shapes defined by IEC60086 or JIS C 8500 that is a standard for a battery defined by International Electrotechnical Commission (IEC) can be employed. Examples thereof include shapes such as a cylindrical shape and a square shape.

Further, the lithium secondary battery is not limited to the aforementioned configuration of the winding type and may have a laminated configuration in which a laminated structure of the positive electrode, the separator, the negative electrode, and the separator is repeatedly overlaid. As the laminated lithium secondary battery, a so-called coin-type battery, a button-type battery, and a paper-type (or sheet-type) battery are exemplary examples.

Hereinafter, the respective configurations will be described in order.

(Positive Electrode)

The positive electrode according to the embodiment can be manufactured by adjusting a positive electrode mixture including a positive electrode active material, a conductive material, and a binder first and causing a positive electrode current collector to carry the positive electrode mixture.

(Conductive Material)

As the conductive material that the positive electrode according to the embodiment has, a carbon material can be used. As the carbon material, graphite powder, carbon black (acetylene black, for example), and a fiber-shaped carbon material are exemplary examples. Since carbon black is a fine powder and has a large surface area, it is possible to increase conductivity inside the positive electrode and to improve charging and discharging efficiency and output properties by adding a small amount of carbon black to the positive electrode mixture while both bonding force between the positive electrode mixture and the positive electrode current collector due to a binder and bonding force inside the positive electrode mixture are degraded and internal resistance rather increases if an excessive amount of carbon black is added.

The proportion of the conductive material in the positive electrode mixture is preferably equal to or greater than 5 parts by mass and equal to or less than 20 parts by mass with respect to 100 parts by mass of positive electrode active material. In a case in which a fiber-shaped carbon material such as graphitized carbon fiber or carbon nanotube is used as a conductive material, it is also possible to reduce the proportion.

(Binder)

As the binder that the positive electrode according to the embodiment has, a thermoplastic resin can be used. Examples of the thermoplastic resin include a fluorine resin such as polyvinylidene fluoride (hereinafter, also referred to as PVdF), polytetrafluoroethylene (hereinafter, also referred to as PTFE), a tetrafluoroethylene/hexafluoropropylene/vinylidene fluoride-based copolymer a hexafluoropropylene/vinylidene fluoride-based copolymer, and a tetrafluoroethylene/perfluorovinyl ether-based copolymer; and a polyolefin resin such as polyethylene and polypropylene.

Two or more kinds of these thermoplastic resins may be mixed and used. It is possible to obtain a positive electrode mixture that provides both high adhesion force with the positive electrode current collector and high bonding force in the positive electrode mixture by using a fluorine resin and a polyolefin resin as binders, setting the proportion of the fluorine resin to be equal to or greater than 1% by mass and equal to or less than 10% by mass, and setting the proportion of the polyolefin resin to be equal to or greater than 0.1% by mass and equal to or less than 2% by mass with respect to the mass of the entire positive electrode mixture.

(Positive Electrode Current Collector)

As the positive electrode current collector that the positive electrode according to the embodiment has, a member with a belt shape that uses a metal material such as Al, Ni, or stainless steel as a formation material can be used. In particular, a member that uses Al as a formation material and that is worked into a thin film shape is preferably used in terms of easiness of working and low cost.

As a method of causing the positive electrode current collector to carry the positive electrode mixture, a method of compression-molding the positive electrode mixture on the positive electrode current collector is an exemplary example. Also, the positive electrode current collector may be caused to carry the positive electrode mixture by forming the positive electrode mixture as a paste using an organic solvent, applying the obtained paste of the positive electrode mixture to at least one surface side of the positive electrode current collector, causing the positive electrode mixture to be dried, and pressing and fixing the positive electrode mixture.

In a case in which the positive electrode mixture is formed into a paste, examples of the organic solvent that can be used include amine-based solvents such as N,N-dimethylaminopropylamine and diethylenetriamine; ether-based solvents such as tetrahydrofuran; ketone-based solvents such as methyl ethyl ketone; ester-based solvents such as methyl acetate; and amide-based solvents such as dimethylacetamide, N-methyl-2-pyrrolidone (hereinafter, also referred to as NMP).

As a method of coating the paste of the positive electrode mixture to the positive electrode current collector, a slit die application method, a screen application method, a curtain application method, a knife application method, a gravure application method, and an electrostatic spray method are exemplary examples.

It is possible to manufacture the positive electrode by the aforementioned method.

(Negative Electrode)

It is only necessary for the negative electrode that the lithium secondary battery according to the embodiment has to be able to dope and de-dope lithium ions with a lower potential than that of the positive electrode, and an electrode obtained by a negative electrode mixture including a negative electrode active substance being carried by a negative electrode current collector and an electrode consisting only of the negative electrode active substance is an exemplary example thereof.

(Negative Electrode Active Substance)

As the negative electrode active substance that the negative electrode has, a carbon material, a chalcogen compound (such as an oxide, sulfide, or the like), a nitride, a metal, or an alloy, which are materials that can dope and de-dope lithium ions with a lower potential than that of the positive electrode, are exemplary examples.

Examples of the carbon materials that can be used as the negative electrode active substance includes graphite such as natural graphite and artificial graphite, cokes, carbon black, thermally decomposed carbons, carbon fiber, and organic polymer compound burned substance.

Examples of the oxide that can be used as the negative electrode active substance includes oxides of silicon represented by a formula $SiO_x$ (here, x is a positive actual number) such as $SiO_2$ and SiO; oxides of titanium represented by a formula $TiO_x$ (here, x is a positive actual number) such as $TiO_2$ and TiO; oxides of vanadium represented by a formula $VO_x$ (here, x is a positive actual number) such as $V_2O_5$ and $VO_2$; oxides of iron represented by a formula $FeO_x$ (here, x is a positive actual number) such as $Fe_3O_4$, $Fe_2O_3$, and FeO; oxides of tin represented by a formula $SnO_x$ (here, x is a positive actual number) such as $SnO_2$ and SnO; oxides of tungsten represented by a formula $WO_x$ (here, x is a positive actual number) such as $WO_3$ and $WO_2$; and composite metal oxides that contain lithium, titanium, or vanadium such as $Li_4Ti_5O_{12}$ and $LiVO_2$.

Examples of the sulfide that can be used as the negative electrode active substance includes: sulfides of titanium represented by a formula $TiS_x$ (here, x is a positive actual number) such as $Ti_2S_3$, $TiS_2$ and TiS; sulfides of vanadium represented by a formula $VS_x$ (here, x is a positive actual number) such as $V_3S_4$, $VS_2$, and VS; sulfides of iron represented by a formula FeS (here, x is a positive actual number) such as $Fe_3S_4$, $FeS_2$, and FeS; sulfides of molybdenum represented by a formula $MoS_x$ (here, x is a positive actual number) such as $Mo_2S_3$ and $MoS_2$; sulfides of tin represented by a formula $SnS_x$ (here, x is a positive actual number) such as $SnS_2$ and SnS; sulfides of tungsten represented by a formula $WS_x$ (here, x is a positive actual number) such as $WS_2$; sulfides of antimony represented by a formula $SbS_x$ (here, x is a positive actual number) such as $Sb_2S_3$; and sulfides of selenium represented by a formula SeS (here, x is a positive actual number) such as $Se_5S_3$, $SeS_2$, and SeS.

Examples of the nitride that can be used as the negative electrode active substance include lithium-containing nitrides such as $Li_3N$ and $Li_{3-x}A_xN$ (here, A is any one or both of Ni and Co, and $0<x<3$ is satisfied).

One kind of these carbon materials, oxides, sulfides, and nitrides may be used alone, or two or more kinds thereof may be used in combination. Also, the carbon materials, oxides, sulfides, and nitrides may be either crystalline substances or amorphous substances.

Also, examples of the metal that can be used as the negative electrode active substance include lithium metal, silicon metal, and tin metal.

Examples that can be used as the negative electrode active substance also includes lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu and Sn—La; and alloys such as $Cu_2Sb$ and $La_3Ni_2Sn_7$.

These metals and alloys are worked into a foil form, for example, and are mainly used alone as an electrode.

Among the aforementioned negative electrode active substances, carbon materials that contains graphite as a main constituent, such as natural graphite and artificial graphite are preferably used for the reasons that there is substantially no change in the potential of the negative electrode from an uncharged state to a fully charged state at the time of charging (satisfactory potential flatness), an average discharging potential is low, a capacitance maintaining rate at the time of causing charging and discharging to repeatedly happen (satisfactory cycle properties). For example, the shape of the carbon material may be any of a thin piece shape such as natural graphite, a spherical shape such as a meso-carbon microbead, a fiber shape such as graphitized carbon fiber, an aggregate of fine powder, and the like.

The aforementioned negative electrode mixture may contain a binder as needed. Examples of the binder include a thermoplastic resin, and specific examples thereof include PVdF, thermoplastic polyimide, carboxymethyl cellulose, polyethylene, and polypropylene.

(Negative Electrode Current Collector)

Examples of the negative electrode current collector that the negative electrode has includes a belt-shaped member that uses, as a formation material, a metal material such as Cu, Ni, or stainless steel. In particular, a negative electrode current collector that uses Cu as a formation material and that is worked into a thin film shape is preferably used in terms of difficult in creation of an alloy with lithium and easiness of working.

Examples of a method of causing such a negative electrode current collector to carry the negative electrode mixture includes a method using compression molding and a method of forming a paste using a solvent or the like, applying the paste to the negative electrode current collector, and drying, pressing, and pressure-bonding the negative electrode mixture similarly to the case of the positive electrode.

(Separator)

As the separator that the lithium secondary battery according to the embodiment has, a material that is made of a material a polyolefin resin such as polyethylene or polypropylene, a fluorine resin, or a nitrogen-containing aromatic polymer and that has form of a porous film, a non-woven cloth, a woven cloth, or the like. Also, two or more kinds of these materials may be used to form the separator, or these materials may be laminated to form the separator.

In the embodiment, permeability resistance based on the Gurley method defined by JIS P 8117 is preferably equal to or greater than 50 seconds/100 cc and equal to or less than 300 seconds/100 cc, and is more preferably equal to or greater than 50 seconds/100 cc and equal to or less than 200 seconds/100 cc in order for the separator to cause the electrolyte to satisfactorily permeate therethrough when the battery is used (at the time of charging and discharging).

Also, the porosity of the separator is preferably equal to or greater than 30% by volume and equal to or less than 80% by volume, and is more preferably equal to or greater than 40% by volume and equal to or less than 70% by volume with respect to the volume of the separator. The separator may be obtained by laminating separators with different porosities.

(Electrolyte Solution)

The electrolyte solution that the lithium secondary battery according to the embodiment has contains an electrolyte and an organic solvent.

Examples of the electrolyte included in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (Here, BOB represents bis (oxalato)borate), LiFSI (Here, FSI represents bis (fluorosulfonyl)imide), a lower aliphatic carboxylic acid lithium salt, and $LiAlCl_4$, and a mixture of two or more kinds thereof may be used. In particular, it is preferable to use, as the electrolyte, an electrolyte that includes at least one kind selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ that includes fluorine.

Also, as the organic solvent included in the electrolyte solution, it is possible to use: carbonates such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethy ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; and carbamates such as 3-methyl-2-oxazolidone; sulfur-containing compounds such as sulfolane, dimethyl sulfoxide and 1,3-propanesultone, or substances obtained by further introducing a fluoro group into these organic solvents (substances obtained by replacing one or more hydrogen atoms that the organic solvent has are substituted with fluorine atoms).

As the organic solvent, two or more kinds thereof are preferably mixed and used. In particular, a mixture solvent including carbonates is preferably used, and a mixture solvent of a cyclic carbonate and a non-cyclic carbonate and a mixture solvent of a cyclic carbonate and ethers are further preferably used. As the mixture solvent of the cyclic carbonate and the non-cyclic carbonate, a mixture solvent that includes an ethylene carbonate, a dimethyl carbonate, and an ethyl methyl carbonate is preferably used. The electrolyte solution using such a mixture solvent have a lot of advantages that an operation temperature range is wide, degradation hardly occurs even if charging and discharging are performed at a high current rate, degradation hardly occurs even after utilization for a long period of time, and the electrolyte solution is persistent even in a case in which a graphite material such as a natural graphite or artificial graphite is used as the negative electrode active material.

Also, as the electrolyte solution, it is preferable to use a lithium compound that includes fluorine such as $LiPF_6$ and an organic solvent that has a fluorine substituent group in order to obtain a safer lithium secondary battery. A mixture solvent that includes ethers that has a fluorine substituent group such as pentafluoropropyl methyl ether or 2,2,3,3-tetrafluoropropyl difluoromethyl ether and dimethyl carbonate is further preferably used due to a high capacitance maintaining rate even at the time of charging and discharging at a high current rate.

A solid electrolyte may be used instead of the aforementioned electrolyte solution. As the solid electrolyte, it is possible to use an organic polymer electrolyte such as a polyethylene oxide-based polymer compound and a polymer compound that includes at least one or more of a polyorganosiloxane chain and a polyoxyalkylene chain. In addition, it is possible to use a so-called gel obtained by causing a polymer compound to hold a nonaqueous electrolyte solution. Also, inorganic solid electrolytes including sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ are exemplary examples, and a mixture of two or more kinds thereof may be used. By using these solid electrolytes, it is possible to further enhance safety of the lithium secondary battery.

Also, in a case in which the solid electrolyte is used in the lithium secondary battery according to the embodiment, the solid electrolyte may serve as a separator, and in such a case, there may be no need to provide a separator.

Since the positive electrode active material with the configuration as described above uses the aforementioned lithium-containing composite metal oxide according to the embodiment, it is possible to extend a lifetime of the lithium secondary battery using the positive electrode active material.

Also, since the positive electrode with the configuration as described above has the aforementioned positive electrode active material for a lithium secondary battery according to the embodiment, it is possible to extend the lifetime of the lithium secondary battery.

Further, since the lithium secondary battery with the configuration as described above has the aforementioned positive electrode, a lithium secondary battery with a longer lifetime than that in the related art is achieved.

EXAMPLES

Next, aspects of the invention will be described in further detail with reference to examples.

In the examples, evaluation of the positive electrode active material for a lithium secondary battery and creation evaluation of the positive electrode for a lithium secondary battery and the lithium secondary battery were conducted as follows.

<Measurement of Pore Distribution of Positive Electrode Active Material 1 for Lithium Secondary Batteries Based on Mercury Intrusion Method>

As pre-processing, the positive electrode active material for lithium secondary batteries was dried at a constant temperature of 120° C. for 4 hours. Measurement of pore distribution was conducted under the following measurement conditions using an Autopore III9420 (manufactured by Micromeritics). Note that the surface tension of mercury was set to 480 dynes/cm and the contact angle between mercury and the sample was set to 140°.

Measurement Conditions

Measurement temperature: 25° C.

Measurement pressure: 1.07 psia to 59256.3 psia

<Measurement of Tap Density of Positive Electrode Active Material for Lithium Secondary Battery>

Tap density was measured on the basis of JIS R 1628-1997.

<Measurement of Average Secondary Particle Diameter of Positive Electrode Active Material for Lithium Secondary Battery>

For measurement of the average secondary particle diameter, a laser diffraction particle size distributer (manufactured by Horiba Ltd., LA-950). 0.1 g of positive electrode active material powder for a lithium secondary battery was poured into 50 ml of an aqueous solution of 0.2% by mass of sodium hexametaphosphate, thereby obtaining a dispersion with the powder dispersed therein. Particle size distribution of the obtained dispersion was measured, and a volume-based cumulative particle size distribution curve was obtained. In the obtained cumulative particle size distribution curve, a value of a particle diameter (D50) when seen from the side of the fine particles at the time of 50% accumulation was regarded as an average secondary particle diameter of the positive electrode active material for a lithium secondary battery.

<BET Specific Surface Area of Positive Electrode Active Material for Lithium Secondary Battery>

After 1 g of positive electrode active material powder for a lithium secondary battery was dried at 105° C. for 30 minutes in a nitrogen atmosphere, measurement was performed using Macsorb (registered trademark) manufactured by Mountec Co., Ltd.

<Creation of Positive Electrode for Peeling Strength Test>

A positive electrode active material for lithium secondary batteries obtained by the manufacturing method, which will be described later, a conductive material (acetylene black), and a binder (PVdF) were added such that the composition of the positive electrode active material for lithium secondary batteries:conductive material:binder=90:5:5 (mass ratio) was satisfied, were kneaded at 5000 rpm for 3 minutes using a Fillmix 30-25 model (manufactured by Primix Corporation), thereby preparing a positive electrode mixture in the paste form. For the preparation of the positive electrode mixture, N-methyl-2-pyrrolidone was used as an organic solvent. The positive electrode mixture in the paste form was applied to an aluminum current collecting foil with the thickness of 20 μm and was dried with warm wind at 90° C. After the drying with the warm wind, the obtained positive electrode was cut into the width of 25 mm and the length of 100 mm and was pressed with a load of 0.3 MPa using a roll presser (manufactured by Tester Sangyo Co., Ltd.). There-after, the positive electrode was dried in vacuum at 150° C. for 8 hours, thereby obtaining a positive electrode for a peeling strength test. The thickness of the positive electrode mixture layer was about 35 μm, and the amount of the carried positive electrode active material for lithium secondary batteries was 7 mg/cm² in the obtained positive electrode.

<Measurement of Peeling Strength>

A method of measuring the peeling strength will be described with reference to FIGS. 2A and 2B.

Figure 2A:
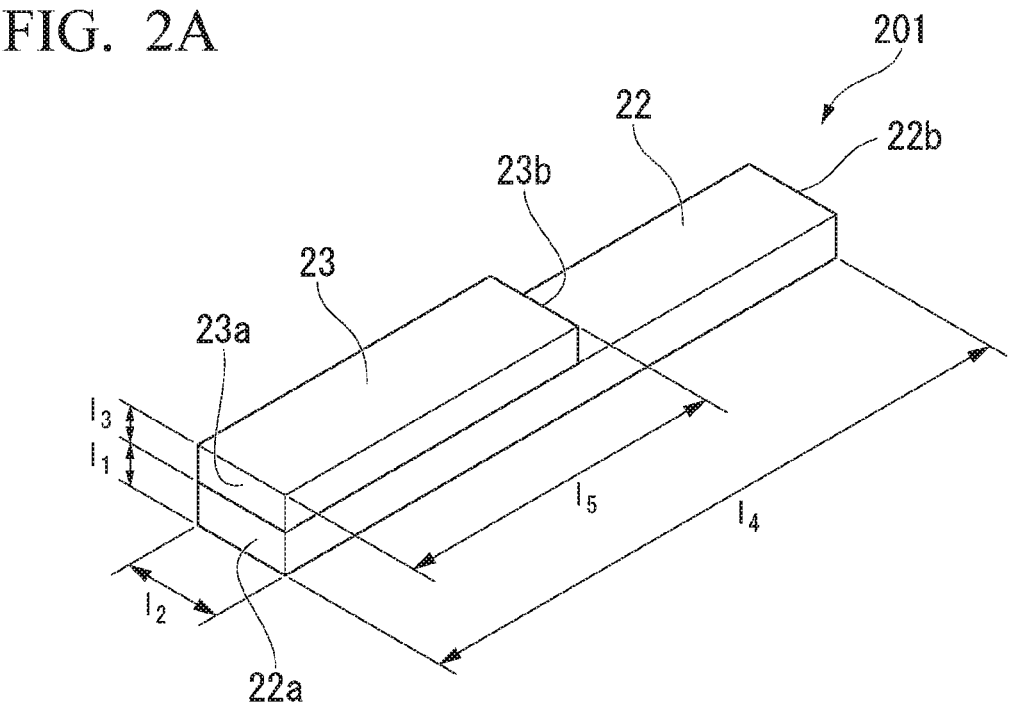
FIG. 2A is schematic diagram of a test piece and a test device used for a peeling strength test.

FIG. 2A shows an electrode for a secondary battery 201 configured from an electrode mixture layer 23 laminated on the current collector 22. The width $l_2$ of the current collector was 25 mm, and the length $l_4$ was 100 mm. The thickness $l_1$ of the current collector was 20 μm, the thickness $l_3$ of the electrode mixture layer was about 35 μm, and the length $l_5$ was 70 mm.

In the electrode for a secondary battery 201, first end 22a of the current collector 22 is aligned with first end 23a of the electrode mixture layer 23. Meanwhile, the second end 22b of the current collector 22 is located at a position away from the second end 23b of the electrode mixture layer 23 in a plan view.

Figure 2B:
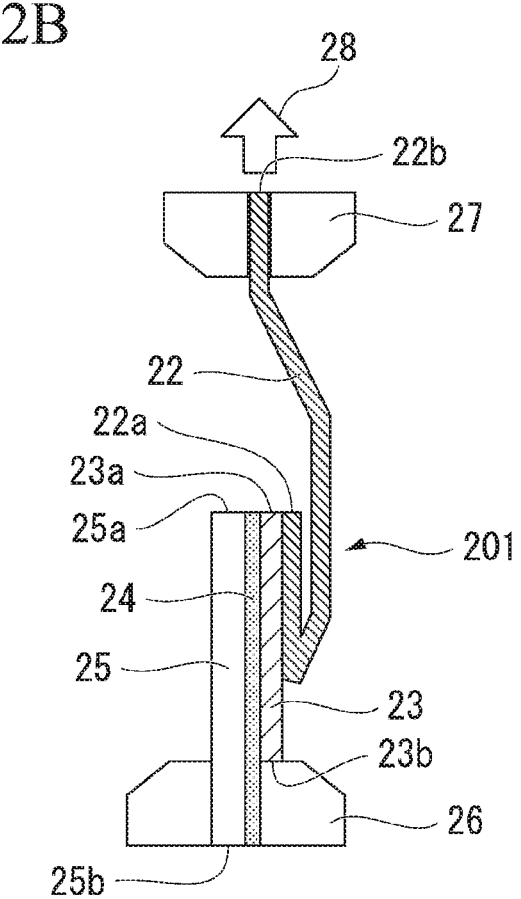
FIG. 2B is a schematic diagram of a test piece and a test device used for a peeling strength test.

FIG. 2B shows a peeling strength measurement device.

The surface of the electrode mixture layer 23 and a substrate 25 (glass epoxy copper clad laminated plate MCL-E-67, manufactured by Hitachi Chemical Co., Ltd.) were secured with a double-sided adhesive tape 24 with a width of 25 mm (Nicetac high-strength double-sided tape NW-K25, manufactured by Nichiban Co., Ltd.), thereby forming a test piece. At this time, a first end 25a of the substrate 25, a first end 22a of the current collector 22, and a first end 23a of the electrode mixture layer 23 were secured such that they are aligned.

The current collector 22 was peeled from the electrode mixture layer 23 from the first end of the electrode, and the substrate was secured to a grip portion 26 below a vertical tensile strength tester (Autograph DSS-500, manufactured by Shimadzu Corporation).

An aluminum foil was added to the current collector 22 and was folded on the side opposite of the electrode mixture 23 from a second end 22b of the aluminum foil that serves as the current collector 22, and the second end 22b of the aluminum foil 22 that serves as the current collector 22 was secured to a gripping portion 27 on the upper side.

Through a 180° peeling test of pulling the current collector 22 toward the upper side (the direction represented with the reference numeral 28 in FIG. 2B) at the tension speed 100 mm/min, the tension strength (N) of the electrode mixture of the electrode for a secondary battery and the current collector was measured.

The peeling strength (N/m) of the electrode mixture and the current collector was calculated from the tension strength (N) and the electrode width (25 mm).

<Composition Analysis>

Composition analysis of the lithium metal composite oxide powder, which were manufactured by the method described later, were conducted using an inductively coupled plasma emission spectrometer (manufactured by Sii Nanotechnology Inc., SPS3000) after the obtained lithium metal composite oxide powder was dissolved in a hydrochloric acid.

<Creation of Positive Electrode for Lithium Secondary Battery>

The positive electrode active material for a lithium secondary battery obtained by the manufacturing method, which will be described later, a conductive material (acetylene black), and a binder (PVdF) were added and kneaded such that the composition of the positive electrode active material for a lithium secondary battery:the conductive material:the binder=92:5:3 (mass ratio) is satisfied, thereby preparing a positive electrode mixture in a paste form. For preparing the positive electrode mixture, N-methyl-2-pyrrolidone was used as an organic solvent.

The obtained positive electrode mixture was applied to an Al foil with the thickness of 40 μm that serves as a current collector and was vacuum-dried at 150° C. for 8 hours, obtaining a positive electrode for a lithium secondary battery. An electrode area of the positive electrode for a lithium secondary battery was set to 1.65 cm².

<Creation of Negative Electrode for Lithium Secondary Battery>

Next, an artificial graphite (MAGD manufactured by Hitachi Chemical Co., Ltd.) as the negative electrode active material, CMC (manufactured by DKS Co., Ltd.) as the binder, and SBR (manufactured by Nippon A&L Co., Ltd.) were added and kneaded such that the composition of the negative electrode active substance:CMC:SRR=98:1:1 (mass ratio) was achieved, thereby preparing a negative electrode mixture in a paste form. For preparing the negative electrode mixture, ion-exchanged water was used as a solvent.

The obtained negative mixture was applied to a Cu foil with the thickness of 12 μm that serves as a current collector and was dried in vacuum at 60° C. for 8 hours, thereby obtaining a negative electrode for a lithium secondary battery. An electrode area of the negative electrode for a lithium secondary battery was set to 1.77 cm².

<Creation of Lithium Secondary Battery (Coin-Type Full-Cell)>

The following operations were conducted in a glove box in an argon atmosphere.

The positive electrode for a lithium secondary battery created in "(2) Creation of positive electrode for lithium secondary battery" was placed on a lower lid of a part for a coin-type battery R2032 (manufactured by Hohsen Corporation) such that the aluminum foil was oriented downward, and a laminated film separator was placed thereon (a heat-resistant porous layer was laminated (thickness: 16 μm) on a porous film made of polyethylene). 300 μl of electrolyte solution was poured thereto. As the electrolyte solution, a substance obtained by adding 1% by volume of vinylene carbonate (hereinafter, also referred to as VC) to a 16:10:74 (volume ratio) mixture solution of ethylene carbonate (hereinafter, also referred to as EC), dimethyl carbonate (hereinafter, also referred to as DMC), and ethyl methyl carbonate (hereinafter, also referred to as EMC) and dissolving LiPF6 therein such that the amount of 1.3 mol/l was satisfied (hereinafter, also represented as LiPF$_6$/EC+DMC+EMC) was used.

Next, the negative electrode for a lithium secondary battery created in <Creation of negative electrode for lithium secondary battery> was placed on the upper side of the laminated film separator, and an upper lid was closed via a gasket and was caulked with a caulking machine, thereby creating a lithium secondary battery (coin-type full-cell R2032; hereinafter, also referred to as a "full-cell").

<Discharging Test>

The full-cell created in <Creation of lithium secondary battery (coin-type full-cell)> was used to conduct an initial charging and discharging test under conditions described below.

<Charging and Discharging Test Conditions>

Test temperature: 25° C.

Charging maximum voltage: 4.2 V, charging time: 6 hours, charging current: 0.2 CA, constant current and constant voltage charging Discharging minimum voltage: 2.7 V, discharging time: 5 hours, discharging current: 0.2 CA, constant current discharging <Measurement of Direct Current Resistance>

On the assumption that the aforementioned measured discharging capacitance was a state of charge (hereinafter, also referred to as SOC) of 100%, and the battery resistance with an SOC of 100% was measured at 25° C. Note that adjustment to each SOC was performed in an environment at 25° C. For the measurement of battery resistance, a full-cell with an adjusted SOC was placed in a stationary manner in a constant-temperature tank at 25° C. for 2 hour, was discharged at 20 μA for 15 seconds, was placed in a stationary manner for 5 minutes, was charged at 20 μA for 15 seconds, was placed in a stationary manner for 5 minutes, was discharged at 40 μm for 15 seconds, was placed in a stationary manner for 5 minutes, was charged at 20 μA for 30 seconds, was placed in a stationary manner for 5 minutes, was discharged at 80 μA for 15 seconds, was placed in a stationary manner for 5 minutes, was charged at 20 μA for 60 seconds, was placed in a stationary manner for 5 minutes, was discharged at 160 μA for 15 seconds, was placed in a stationary manner for 5 minutes, was charged at 20 μA for 120 seconds, and was placed in a stationary manner for 5 minutes in this order. For the battery resistance, inclination was calculated using a least square approximation method from plots of a battery voltage and each current value measured at 10 seconds after the discharging of 20, 40, 80, and 120 μA.

Example 1

1. Manufacturing of Positive Electrode Active Material 1 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. The air flow rate was adjusted such that a ratio A/B between the air flow rate A (L/min) and a reaction volume B(L) became 0.013, and the reaction tank was caused to be successively ventilated. An aqueous solution of sodium hydroxide was timely dropped such that pH of the solution in the reaction tank became 12.0 at the time of measurement at 40° C., nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 1.

The nickel, cobalt, manganese composite hydroxide 1 obtained as described above and lithium carbonate powder were weighed and mixed such that the molar ratio of Li/(Ni+Co+Mn)=1.08 was satisfied, were burned at 760° C. for 5 hours in an ambient air atmosphere, and were further burned at 875° C. for 10 hours in an ambient air atmosphere, thereby obtaining a target positive electrode active material 1 for lithium secondary batteries.

2. Evaluation of Positive Electrode Active Material 1 for Lithium Secondary Battery Since the composition of the obtained positive electrode active material 1 for a lithium secondary battery was analyzed and caused to correspond to the composition formula (I), x=0.036, y=0.211, z=0.238, and w=0 were obtained.

The pore peak of the positive electrode active material 1 for lithium secondary batteries measured through aforementioned measurement of pore distribution based on the mercury intrusion method was 56 nm, and the total surface area of pores with pore radii within a range of equal to or greater than 100 nm and equal to or less than 10 μm was 0.854 $m^2$/g.

Also, the tap density of the positive electrode active material 1 for lithium secondary batteries was 1.47 g/cc, and D50 was 4.6 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 1 for lithium secondary batteries was 0.17.

In addition, the peeling strength of the positive electrode active material 1 for lithium secondary batteries was 189 N/m, and the direct current resistance was 14.1Ω.

Example 2

1. Manufacturing of Positive Electrode Active Material 2 for Lithium Secondary Battery After water was poured into a reaction tank provided with a stirrer and an overflow pipe, an aqueous solution of sodium hydroxide was added, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. The air flow rate was adjusted such that a ratio A/B of the air flow rate A (L/min) and the reaction volume B(L) became 0.006, and the reaction tank was caused to be successively ventilated. An aqueous solution of sodium hydroxide was timely dropped such that pH of the solution in the reaction tank became 12.5 at the time of measurement at 40° C., and nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 2.

The nickel, cobalt, manganese composite hydroxide 2 obtained as described above and lithium carbonate powder were weighed and mixed such that the molar ratio of Li/(Ni+Co+Mn)=1.10 was satisfied, were burned at 760° C. for 5 hours in an ambient air atmosphere, and were further burned at 875° C. for 10 hours in an ambient air atmosphere, thereby obtaining a target positive electrode active material 2 for lithium secondary batteries.

2. Evaluation of Positive Electrode Active Material 2 for Lithium Secondary Batteries When the composition of the obtained positive electrode active material 2 for lithium secondary batteries was analyzed and caused to correspond to the composition formula (I), x=0.049, y=0.209, z=0.242, and w=0 were obtained.

The pore peak of the positive electrode active material 2 for lithium secondary batteries measured through the aforementioned measurement of pore distribution based on the mercury intrusion method was 71 nm, and the total surface area of pores with pore radii within a range of equal to or greater than 100 nm and equal to or less than 10 μm was 0.487 m²/g.

Also, the tap density of the positive electrode active material 2 for lithium secondary batteries was 1.89 g/cc, and D50 was 6.6 μm.

In addition, (the total surface are of pores with pore radii of equal to or greater than 10 nm and equal to or less than 50 nm)/(total surface area of pores with pore radii of equal to or greater than 10 nm and equal to or less than 100 μm) of the positive electrode active material 2 for lithium secondary batteries was 0.30.

Also, the peeling strength of the positive electrode active material 2 for lithium secondary batteries was 279 N/m, and the direction current resistance was 15.6Ω.

Example 3

1. Manufacturing of Positive Electrode Active Material 3 for Lithium Secondary Battery After water was poured into a reaction tank provided with a stirrer and an overflow pipe, an aqueous solution of sodium hydroxide was added, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms became 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. Operations that are similar to those in Example 2 other than that the air flow rate was adjusted such that the ratio A/B of the air flow rate A (L/min) and the reaction volume B(L) became 0.011 and the reaction tank was caused to be successively ventilated, thereby obtaining a nickel, cobalt, manganese composite hydroxide 3.

The nickel, cobalt, manganese composite hydroxide 3 obtained as described above and lithium carbonate powder were weighed and mixed such that the molar ratio of Li/(Ni+Co+Mn)=1.05 was satisfied, were burned at 760° C. for 5 hours in an ambient air atmosphere, and were further burned at 875° C. for 10 hours in an ambient air atmosphere, thereby obtaining a target positive electrode active material 3 for lithium secondary batteries.

2. Evaluation of Positive Electrode Active Material 3 for Lithium Secondary Batteries When the composition of the obtained positive electrode active material 3 for lithium secondary batteries was analyzed and caused to correspond to the composition formula (I), x=0.025, y=0.209, z=0.240, and w=0 were obtained.

The pore peak of the positive electrode active material 3 for lithium secondary batteries measured through aforementioned measurement of pore distribution based on the mercury intrusion method was 108 nm, and the total surface area of pores with pore radii within a range of equal to or greater than 100 nm and equal to or less than 10 μm was 0.669 m²/g.

Also, the tap density of the positive electrode active material 3 for lithium secondary batteries was 1.85 g/cc, and D50 was 6.6 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 3 for lithium secondary batteries was 0.35.

In addition, the peeling strength of the positive electrode active material 3 for lithium secondary batteries was 214 N/m, and the direct current resistance was 14.6Ω.

Example 4

1. Manufacturing of Positive Electrode Active Material 4 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. Operations that are similar to those in Example 2 other than that the air flow rate was adjusted such that a ratio A/B of the air flow rate A (L/min) and the reaction volume B(L) became 0.005 and the reaction tank was caused to be successively ventilated, thereby obtaining a nickel, cobalt, manganese composite hydroxide 4.

The nickel, cobalt, manganese composite hydroxide 4 obtained as described above and lithium carbonate powder were weighed and mixed such that the molar ratio of Li/(Ni+Co+Mn)=1.05 was satisfied, were burned at 760° C. for 5 hours in an ambient air atmosphere, and were further burned at 875° C. for 10 hours in an ambient air atmosphere, thereby obtaining a target positive electrode active material 4 for lithium secondary batteries.

2. Evaluation of Positive Electrode Active Material 4 for Lithium Secondary Batteries When the composition of the obtained positive electrode active material 4 for lithium secondary batteries was analyzed and caused to correspond to the composition formula (I), x=0.020, y=0.208, z=0.240, and w=0 were obtained.

The pore peak of the positive electrode active material 4 for lithium secondary batteries measured through aforementioned measurement of pore distribution based on the mercury intrusion method was 108 nm, and the total surface area of pores with pore radii within a range of equal to or greater than 100 nm and equal to or less than 10 μm was 0.484 m²/g.

Also, the tap density of the positive electrode active material 4 for lithium secondary batteries was 1.92 g/cc, and D50 was 7.1 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 4 for lithium secondary batteries was 0.48.

In addition, the peeling strength of the positive electrode active material 4 for lithium secondary batteries was 272 N/m, and the direct current resistance was 15.1Ω.

Example 5

1. Manufacturing of Positive Electrode Active Material 5 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. Operations that are similar to those in Example 2 other than that the air flow rate was adjusted such that a ratio A/B of the air flow rate A (L/min) and the reaction volume B(L) became 0.009 and the reaction tank was caused to be successively ventilated, thereby obtaining a nickel, cobalt, manganese composite hydroxide 5.

The nickel, cobalt, manganese composite hydroxide 5 obtained as described above and lithium carbonate powder were weighed and mixed such that the molar ratio of Li/(Ni+Co+Mn)=1.06 was satisfied, were burned at 760° C. for 5 hours in an ambient air atmosphere, and were further burned at 875° C. for 10 hours in an ambient air atmosphere, thereby obtaining a target positive electrode active material 5 for lithium secondary batteries.

2. Evaluation of Positive Electrode Active Material 5 for Lithium Secondary Batteries When the composition of the obtained positive electrode active material 5 for lithium secondary batteries was analyzed and caused to correspond to the composition formula (I), x=0.028, y=0.208, z=0.241, and w=0 were obtained.

The pore peak of the positive electrode active material 5 for lithium secondary batteries measured through aforementioned measurement of pore distribution based on the mercury intrusion method was 89 nm, and the total surface area of pores with pore radii within a range of equal to or greater than 100 nm and equal to or less than 10 μm was 0.546 m$^2$/g.

Also, the tap density of the positive electrode active material 5 for lithium secondary batteries was 1.81 g/cc, and D50 was 6.7 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 5 for lithium secondary batteries was 0.20.

In addition, the peeling strength of the positive electrode active material 5 for lithium secondary batteries was 194 N/m, and the direct current resistance was 14.8Ω.

Example 6

1. Manufacturing of Positive Electrode Active Material 6 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that the atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. Operations that are similar to those in Example 2 other than that the air flow rate was adjusted such that a ratio A/B of the air flow rate A (L/min) and the reaction volume B(L) became 0.018 and the reaction tank was caused to be successively ventilated, thereby obtaining a nickel, cobalt, manganese composite hydroxide 6.

The nickel, cobalt, manganese composite hydroxide 6 obtained as described above and lithium carbonate powder were weighed and mixed such that the molar ratio of Li/(Ni+Co+Mn)=1.07 was satisfied, were burned at 760° C. for 5 hours in an ambient air atmosphere, and were further burned at 875° C. for 10 hours in an ambient air atmosphere, thereby obtaining a target positive electrode active material 6 for lithium secondary batteries.

2. Evaluation of Positive Electrode Active Material 6 for Lithium Secondary Batteries When the composition of the obtained positive electrode active material 6 for lithium secondary batteries was analyzed and caused to correspond to the composition formula (I), x=0.039, y=0.209, z=0.241, and w=0 were obtained.

The pore peak of the positive electrode active material 6 for lithium secondary batteries measured through aforementioned measurement of pore distribution based on the mercury intrusion method was 108 nm, and the total surface area of pores with pore radii within a range of equal to or greater than 100 nm and equal to or less than 10 μm was 0.896 m$^2$/g.

Also, the tap density of the positive electrode active material 6 for lithium secondary batteries was 1.70 g/cc, and D50 was 6.2 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 6 for lithium secondary batteries was 0.05.

In addition, the peeling strength of the positive electrode active material 6 for lithium secondary batteries was 166 N/m, and the direct current resistance was 14.7Ω.

Comparative Example 1

1. Manufacturing of Positive Electrode Active Material 7 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. The air flow rate was adjusted such that a ratio A/B between the air flow rate A (L/min) and a reaction volume B(L)

became 0.025, and the reaction tank was caused to be successively ventilated. An aqueous solution of sodium hydroxide was timely dropped such that pH of the solution in the reaction tank became 12.5 at the time of measurement at 40° C., nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 7.

The nickel, cobalt, manganese composite hydroxide 7 obtained as described above and lithium carbonate powder were weighed and mixed such that the molar ratio of Li/(Ni+Co+Mn)=1.06 was satisfied, were burned at 760° C. for 5 hours in an ambient air atmosphere, and were further burned at 875° C. for 10 hours in an ambient air atmosphere, thereby obtaining a target positive electrode active material 7 for lithium secondary batteries.

2. Evaluation of Positive Electrode Active Material 7 for Lithium Secondary Batteries When the composition of the obtained positive electrode active material 7 for lithium secondary batteries was analyzed and caused to correspond to the composition formula (I), x=0.029, y=0.210, z=0.241, and w=0 were obtained.

The pore peak of the positive electrode active material 7 for lithium secondary batteries measured through aforementioned measurement of pore distribution based on the mercury intrusion method was 108 nm, and the total surface area of pores with pore radii within a range of equal to or greater than 100 nm and equal to or less than 10 μm was 1.14 m$^2$/g.

Also, the tap density of the positive electrode active material 7 for lithium secondary batteries was 1.51 g/cc, and D50 was 5.7 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 7 for lithium secondary batteries was 0.05.

In addition, the peeling strength of the positive electrode active material 7 for lithium secondary batteries was 35 N/m, and the direct current resistance was 14.1Ω.

Comparative Example 2

1. Manufacturing of Positive Electrode Active Material 8 for Lithium Secondary Battery After water was poured into a reaction tank provided with a stirrer and an overflow pipe, an aqueous solution of sodium hydroxide was added thereto, and the liquid temperature was maintained at 50° C.

An aqueous solution of nickel sulfate, an aqueous solution of cobalt sulfate, and an aqueous solution of manganese sulfate were mixed such that an atomic ratio of nickel atoms, cobalt atoms, and manganese atoms satisfied 0.55:0.21:0.24, thereby preparing a mixture starting solution.

Next, the mixture starting solution and an aqueous solution of ammonium sulfate were successively added as a complexing agent to the reaction tank while being stirred, and nitrogen gas was caused to be successively ventilated. An aqueous solution of sodium hydroxide was timely dropped such that pH of the solution in the reaction tank became 13.0 at the time of measurement at 40° C., nickel, cobalt, manganese composite hydroxide particles were obtained, were washed with a sodium hydroxide solution, were dehydrated and isolated with a centrifugal separator, and were dried at 105° C., thereby obtaining a nickel, cobalt, manganese composite hydroxide 8.

The nickel, cobalt, manganese composite hydroxide 8 obtained as described above and lithium carbonate powder were weighed and mixed such that the molar ratio of Li/(Ni+Co+Mn)=1.06 was satisfied, were burned at 760° C. for 5 hours in an ambient air atmosphere, were further burned at 875° C. for 10 hours in an ambient air atmosphere, and were additionally burned at 900° C. for 10 hours in an ambient air atmosphere, thereby obtaining a target positive electrode active material 8 for lithium secondary batteries.

2. Evaluation of Positive Electrode Active Material 8 for Lithium secondary batteries When the composition of the obtained positive electrode active material 8 for lithium secondary batteries was analyzed and caused to correspond to the composition formula (I), x=0.031, y=0.207, z=0.236, and w=0 were obtained.

The pore peak of the positive electrode active material 8 for lithium secondary batteries measured through aforementioned measurement of pore distribution based on the mercury intrusion method was not present, and the total surface area of pores with pore radii within a range of equal to or greater than 100 nm and equal to or less than 10 μm was 0.732 m$^2$/g.

Also, the tap density of the positive electrode active material 8 for lithium secondary batteries was 1.62 g/cc, and D50 was 5.5 μm.

Also, (the total surface area of pores with pore radii of equal to or greater than 10 nm and equal to or less than 50 nm)/(the total surface area of pores with pore radii of equal to or greater than 10 nm and equal to or less than 100 μm) of the positive electrode active material 8 for lithium secondary batteries was 0.00.

In addition, the peeling strength of the positive electrode active material 8 for lithium secondary batteries was 210 N/m, and the direct current resistance was 17.2Ω.

TABLE 1

|  | Pore peak (nm) | Pore surface area (m2/g) | Tap density (g/cc) | D50 (μm) | Pore surface area (10 nm to 50 nm)/pore surface area (10 nm to 100 μm) | Peeling strength (N/m) | Direct current resistance (Ω) |
| --- | --- | --- | --- | --- | --- | --- | --- |
| Example 1 | 56 | 0.854 | 1.47 | 4.6 | 0.17 | 189 | 14.1 |
| Example 2 | 71 | 0.487 | 1.89 | 6.6 | 0.30 | 279 | 15.6 |
| Example 3 | 108 | 0.669 | 1.85 | 6.6 | 0.35 | 214 | 14.6 |
| Example 4 | 108 | 0.484 | 1.92 | 7.1 | 0.48 | 272 | 15.1 |
| Example 5 | 89 | 0.546 | 1.81 | 6.7 | 0.20 | 194 | 14.8 |
| Example 6 | 108 | 0.896 | 1.70 | 6.2 | 0.05 | 166 | 14.7 |
| Comparative Example 1 | 108 | 1.14 | 1.51 | 5.7 | 0.05 | 35 | 14.1 |
| Comparative Example 2 | None | 0.732 | 1.62 | 5.5 | 0.00 | 210 | 17.2 |

As described above, the peeling strength was as high as 150 N/m or more, and the direct current resistance was also as low as 16Ω or less in all Examples 1 to 5 to which the invention was applied.

Meanwhile, the peeling strength was as significantly low as 35 N/m in Comparative Example 1, and the direct current resistance greatly exceeded 16Ω in Comparative Example 2, to which the invention was not applied.

INDUSTRIAL APPLICABILITY

According to the invention, it is possible to provide a positive electrode active material for lithium batteries with low battery resistance and improved peeling strength, a positive electrode for lithium secondary batteries using the positive electrode active material for lithium secondary batteries, and a lithium secondary battery including the positive electrode for lithium secondary batteries.

The positive electrode for lithium secondary batteries according to the invention is useful for lithium secondary batteries suitable for in-vehicle utilization.

REFERENCE SIGNS LIST

1 Separator
2 Positive electrode
3 Negative electrode
4 Electrode group
5 Battery case
6 Electrolyte solution
7 Top insulator
8 Sealing body
10 Lithium secondary battery
21 Positive electrode lead
31 Negative electrode lead

What is claimed is:

1. A positive electrode active material for lithium secondary batteries comprising:
secondary particles obtained by coagulating primary particles capable of being doped and de-doped with lithium ions,
wherein the secondary particles have pores, and
pore distribution obtained by a mercury intrusion method satisfies requirements (1) and (2) below:
(1) pores that are present in any one or both of the secondary particles or spaces between the secondary particles have a pore peak within a range of a pore radius of equal to or greater than 10 nm and equal to or less than 200 nm; and
(2) a total surface area of pores that have pore radii of equal to or greater than 100 nm and equal to or less than 10 μm among the pores that are present in inter-secondary particle gaps is less than 1.1 m²/g.

2. The positive electrode active material for lithium secondary batteries according to claim 1, wherein the positive electrode active material is represented by the following composition formula (I):

$$Li[Li_x(Ni_{1-y-z-w}Co_yMn_zM_w)_{1-x}]O_2 \quad (I)$$

(where M represents one or more elements selected from the group consisting of Fe, Cu, Ti, Mg, Al, W, B, Mo, Nb, Zn, Sn, Zr, Ga, and V, and $0 \leq x \leq 0.2$, $0 < y \leq 0.4$, $0 \leq z \leq 0.4$, and $0 \leq w \leq 0.1$ are satisfied).

3. The positive electrode active material for lithium secondary batteries according to claim 1, wherein tap bulk density is equal to or less than 2.5 g/cc.

4. The positive electrode active material for lithium secondary batteries according to claim 1, wherein an average secondary particle diameter is equal to or greater than 3 μm and equal to or less than 15 μm.

5. The positive electrode active material for lithium secondary batteries according to claim 1, wherein (a total surface area of pores that have pore radii of equal to or greater than 10 nm and equal to or less than 50 nm)/(a total surface area of pores that have pore radii of equal to or greater than 10 nm and equal to or less than 100 μm) is equal to or greater than 0.20.

6. A positive electrode for lithium secondary batteries comprising the positive electrode active material for lithium secondary batteries according to claim 1.

7. A lithium secondary battery comprising the positive electrode for lithium secondary batteries according to claim 6.

8. The positive electrode active material for lithium secondary batteries according to claim 1, wherein a total surface area of pores that have pore radii of equal to or greater than 100 nm and equal to or less than 10 μm is less than 0.9 m²/g.

9. A positive electrode active material for lithium secondary batteries comprising:
secondary particles obtained by coagulating primary particles capable of being doped and de-doped with lithium ions,
wherein the secondary particles have pores, and
pore distribution obtained by a mercury intrusion method satisfies requirements (1), (2), and (3) below:
(1) pores that are present in any one or both of the secondary particles or spaces between the secondary particles have a pore peak within a range of a pore radius of equal to or greater than 10 nm and equal to or less than 200 nm;
(2) a total surface area of pores that have pore radii of equal to or greater than 100 nm and equal to or less than 10 μm among the pores that are present in any one or both of the secondary particles or spaces between the secondary particles is less than 1.1 m²/g; and
(3) (a total surface area of pores that have pore radii of equal to or greater than 10 nm and equal to or less than 50 nm)/(a total surface area of pores that have pore radii of equal to or greater than 10 nm and equal to or less than 100 μm) is equal to or greater than 0.20.

10. The positive electrode active material for lithium secondary batteries according to claim 9, wherein a total surface area of pores that have pore radii of equal to or greater than 100 nm and equal to or less than 10 μm is less than 0.9 m²/g.

11. The positive electrode active material for lithium secondary batteries according to claim 9, wherein the positive electrode active material is represented by the following composition formula (I):

$$Li[Li_x(Ni_{1-y-z-w}Co_yMn_zM_w)_{1-x}]O_2 \quad (I)$$

(where M represents one or more elements selected from the group consisting of Fe, Cu, Ti, Mg, Al, W, B, Mo, Nb, Zn, Sn, Zr, Ga, and V, and $0 \leq x \leq 0.2$, $0 < y \leq 0.4$, $0 \leq z \leq 0.4$, and $0 \leq w \leq 0.1$ are satisfied).

12. The positive electrode active material for lithium secondary batteries according to claim 9, wherein tap bulk density is equal to or less than 2.5 g/cc.

13. The positive electrode active material for lithium secondary batteries according to claim 9, wherein an average secondary particle diameter is equal to or greater than 3 μm and equal to or less than 15 μm.

14. A positive electrode for lithium secondary batteries comprising the positive electrode active material for lithium secondary batteries according to claim 9.

15. A lithium secondary battery comprising the positive electrode for lithium secondary batteries according to claim 14.

* * * * *